United States Patent
Flickner et al.

(10) Patent No.: US 8,801,005 B1
(45) Date of Patent: Aug. 12, 2014

(54) ROLLED MATERIAL TRANSFER CART

(75) Inventors: Brett Jay Flickner, Folsom, CA (US); David Ryan Porter, Placerville, CA (US)

(73) Assignee: DST Output West, LLC, El Dorado Hills, CA (US)

( * ) Notice: Subject to any disclaimer, the term of this patent is extended or adjusted under 35 U.S.C. 154(b) by 101 days.

(21) Appl. No.: 13/252,847

(22) Filed: Oct. 4, 2011

(51) Int. Cl.
*B62B 3/10* (2006.01)

(52) U.S. Cl.
USPC ....... 280/79.2; 280/35; 280/47.35; 280/47.26

(58) Field of Classification Search
CPC ............ B62B 1/22; B62B 1/186; B62B 1/20; B62B 1/264; B62B 3/02; B62B 3/04; B62B 3/025; B62B 3/10; B62B 3/104; B62B 1/12; B62B 1/14; B62B 1/10; B65F 1/14; B65F 1/1426
USPC ............ 280/79.11, 79.2, 79.3, 79.5, 79.6, 35, 280/47.35, 28.12, 47.31, 47.21, 47.24, 280/47.26; 414/460, 426–430
See application file for complete search history.

(56) References Cited

U.S. PATENT DOCUMENTS

| | | | | |
|---|---|---|---|---|
| 2,155,769 A * | 4/1939 | Porter | ......................... | 242/598.3 |
| 2,452,481 A * | 10/1948 | Morehead et al. | ............ | 414/428 |
| 2,763,383 A * | 9/1956 | McCoy | ......................... | 414/542 |
| 3,570,731 A * | 3/1971 | Waltz | ............................ | 225/38 |
| 3,667,305 A * | 6/1972 | Rasoira | ........................ | 74/818 |
| 3,902,679 A * | 9/1975 | Bost | ............................. | 242/129 |
| 4,183,710 A * | 1/1980 | Burdick | ........................ | 414/671 |
| 4,216,640 A * | 8/1980 | Kaufman | ....................... | 53/556 |
| 4,482,225 A * | 11/1984 | Moyroud et al. | ............. | 396/559 |
| 4,564,152 A * | 1/1986 | Herriage | ..................... | 242/422.4 |
| 4,572,761 A * | 2/1986 | Phillips, Sr. | ................... | 156/511 |
| 4,589,811 A * | 5/1986 | Riccardo et al. | .......... | 414/224.01 |
| 4,605,237 A * | 8/1986 | Torgrimson | ................ | 280/47.24 |
| 4,640,521 A * | 2/1987 | Berfield | ...................... | 280/47.34 |
| 4,662,151 A * | 5/1987 | Mathes et al. | .................. | 53/587 |
| 4,740,131 A * | 4/1988 | Mayle | ............................ | 414/460 |
| 4,845,920 A * | 7/1989 | Lancaster | ....................... | 53/399 |
| 4,858,415 A * | 8/1989 | Hake | ............................... | 53/438 |
| 5,037,118 A * | 8/1991 | Straube | ........................ | 280/79.6 |
| 5,042,225 A * | 8/1991 | Drury et al. | ..................... | 53/211 |
| 5,100,074 A * | 3/1992 | Jones | .......................... | 242/420.6 |
| 5,253,972 A * | 10/1993 | Drew et al. | .................... | 414/469 |
| 5,275,349 A * | 1/1994 | Tussing | .......................... | 242/557 |
| 5,316,232 A * | 5/1994 | Lambert, Jr. | ............... | 242/422.4 |
| 5,320,295 A * | 6/1994 | Jaaskelainen et al. | ...... | 242/559.4 |

(Continued)

OTHER PUBLICATIONS www.kerncan.com—Data Sheet—"The Kern Roll Cart: for Effortless Transportation of Rolls from Pallets"—published online Jan. 22, 2010, 1 page.

(Continued)

*Primary Examiner* — Jeffrey J Restifo
*Assistant Examiner* — Erez Gurari
(74) *Attorney, Agent, or Firm* — James M. Ritchey (57) ABSTRACT

A paper roll cart for storing, holding for usage, and transporting a variably-sized roll of paper includes a wheeled base, a paper roll support that is rotationally mounted to the wheeled base, a paper roll securing mechanism coupled to the wheeled base for releasably anchoring the paper roll to the cart, and a cart movement control system attached to the wheeled base for assisting in the movement of the paper cart from one location to another location.

16 Claims, 12 Drawing Sheets

(56) References Cited

U.S. PATENT DOCUMENTS

| | | | | |
|---|---|---|---|---|
| 5,365,723 | A * | 11/1994 | Ramos | 53/556 |
| 5,423,163 | A * | 6/1995 | Wendt | 53/556 |
| 5,509,671 | A * | 4/1996 | Campbell | 280/47.19 |
| 5,544,468 | A * | 8/1996 | Harrison et al. | 53/390 |
| 5,544,719 | A * | 8/1996 | Boriani et al. | 187/237 |
| 5,606,849 | A * | 3/1997 | Bettenhausen | 53/556 |
| 5,667,163 | A * | 9/1997 | Sordahl | 242/557 |
| 5,697,756 | A * | 12/1997 | Wheaton | 414/680 |
| 5,913,527 | A * | 6/1999 | Hailston | 280/47.28 |
| 5,915,646 | A * | 6/1999 | Campbell | 242/594.4 |
| 6,086,013 | A * | 7/2000 | Looney et al. | 242/594.4 |
| 6,086,310 | A * | 7/2000 | Lujan et al. | 414/444 |
| 6,109,561 | A * | 8/2000 | Haines | 242/615.2 |
| 6,302,414 | B1 * | 10/2001 | Berthiaume et al. | 280/47.18 |
| 6,341,470 | B1 * | 1/2002 | Lacey | 53/176 |
| 6,367,822 | B1 * | 4/2002 | Hutchins | 280/47.24 |
| 6,416,010 | B2 * | 7/2002 | Fletcher | 242/397 |
| 6,422,504 | B1 * | 7/2002 | Elder | 242/594.6 |
| 6,708,469 | B2 * | 3/2004 | Lacey | 53/582 |
| 6,837,502 | B1 * | 1/2005 | Lee | 280/79.5 |
| 6,860,496 | B2 * | 3/2005 | Novak et al. | 280/79.11 |
| 7,004,422 | B1 * | 2/2006 | Chen | 242/588 |
| 7,114,742 | B1 * | 10/2006 | Sterns | 280/639 |
| 7,124,674 | B2 * | 10/2006 | Maxey | 83/649 |
| 7,124,980 | B2 * | 10/2006 | Giovannoni | 242/557 |
| 7,195,257 | B2 * | 3/2007 | Stoneback et al. | 280/79.6 |
| 7,243,876 | B2 * | 7/2007 | Robison | 242/557 |
| 7,284,942 | B1 * | 10/2007 | Allen | 414/430 |
| 7,398,979 | B2 * | 7/2008 | Yu Chen | 280/47.24 |
| 7,472,916 | B2 * | 1/2009 | Varcoe | 280/19 |
| 7,494,308 | B2 * | 2/2009 | Chun | 410/47 |
| 7,914,016 | B2 * | 3/2011 | Guttormson | 280/47.19 |
| 7,963,534 | B2 * | 6/2011 | Sloat | 280/79.5 |
| 7,988,402 | B2 * | 8/2011 | Adams | 414/426 |
| 8,096,745 | B2 * | 1/2012 | Lamothe | 414/428 |
| 8,276,692 | B1 * | 10/2012 | Nwaeke | 180/65.1 |
| 8,366,126 | B2 * | 2/2013 | Galgano et al. | 280/47.19 |
| 2004/0262869 | A1 * | 12/2004 | Reining | 280/79.11 |
| 2006/0038053 | A1 * | 2/2006 | Giovannoni | 242/557 |
| 2006/0131825 | A1 * | 6/2006 | Stoneback et al. | 280/79.6 |
| 2009/0224498 | A1 * | 9/2009 | Diedericks | 280/79.6 |
| 2009/0250889 | A1 * | 10/2009 | Palmore | 280/47.21 |
| 2010/0092270 | A1 * | 4/2010 | Adams | 414/427 |
| 2011/0121529 | A1 * | 5/2011 | Cabassa | 280/47.35 |
| 2012/0318939 | A1 * | 12/2012 | Galgano et al. | 248/127 |

OTHER PUBLICATIONS www.kerncan.com—Data Sheet—"The Kern Roll Jack: An Easy and Safe Paper Handling Solution"—published online Jan. 22, 2010, 1 page.

* cited by examiner

ROLLED MATERIAL TRANSFER CART

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to a material, usually paper although cloth and other materials are considered to be within the realm of this disclosure, roll holding and transport cart. More particularly, the subject invention relates to a holding and transfer cart for storage, holding for usage, and moving of variably-sized rolls of paper from one location to another, wherein a single operator or powered towing device may be utilized with one or more carts to easily and safely hold and move large rolls of paper.

2. Description of Related Art

Although multiple-purposed dollies, hand-trucks, forklifts and the like are employed to transport large rolls of paper, after an extensive search, no manufacturer was found that rented, sold, or would even design a versatile, yet dedicated paper roll cart capable of moving variably-sized large (often well over 1000 lbs) paper rolls in a convenient, safe, and efficient manner.

BRIEF SUMMARY OF THE INVENTION

An object of the present invention is to provide a paper roll cart for holding and transporting variably-sized and variably-massed paper rolls by hand or by means of a powered transport device.

Another object of the present invention is to furnish a paper roll cart that may be used by itself or hooked with other like carts for multiple-cart transport by either a single operator or a powered transport device.

A further object of the present invention is to supply a paper roll cart that is fitted with paper roll securing means to prevent the roll from experiencing undesired movement during transport, storage, and usage situations.

Still another object of the present invention is to disclose a paper roll cart with various safety features that include a floor brake, a safety latch that secures multiple carts together unless and operator disengages the latch, and outriggers for transport stability while moving around corners.

Yet a further object of the present invention is to describe a paper roll cart that permits the paper roll to be rotated 360 degrees after it is mounted to the cart.

Still yet an additional object of the present invention is to disclose a paper roll cart that is extremely versatile and functions with varied unwinders and rewinders due to the cart's narrow end width.

Disclosed is a material roll cart for storing, holding for usage, and transporting variably-sized rolls of material. The subject invention comprises: a wheeled base member; a roll supporting platform rotationally mounted to said wheeled base member; roll securing means coupled to said wheeled base member for releasably anchoring the roll to the cart; and cart movement control means attached to said wheeled base member for assisting in the movement of said cart from one location to another location.

Frequently, the subject material is paper and the paper roll cart is utilized for storing, holding for usage, and transporting variably-sized rolls of paper. The subject invention comprising a wheeled base member, comprising: a base frame having a front region, a rear region, and two side regions extending between the front and rear regions; a first set of wheels mounted to the base frame front region; and a second set of wheels mounted to the base frame rear region, wherein the first set of wheels are spaced closer to one another than in the second set of wheels. The paper roll supporting means is rotationally mounted to the wheeled base member, wherein the paper roll supporting means comprises a rotatable platform having a concave upper surface for receiving the paper roll.

Further, the paper roll securing means is coupled to the wheeled base member for releasably anchoring the roll to the cart, wherein the paper roll securing means comprises: a paper roll securing rod having first and second ends, wherein the paper roll securing rod runs through the middle of the paper roll when the paper roll is secured to the cart; first strap attachment means fastened to the rod first end; second strap attachment means removably secured to the rod second end; first releasable strap means attached to the wheeled base member proximate the second set of wheels, wherein the first releasable strap means releasably couples to the first strap attachment means; and second releasable strap means attached to the wheeled base member proximate the second set of wheels, wherein the second releasable strap means releasably couples to the second strap attachment means.

Additionally, the cart movement control means is attached to the wheeled base member for assisting in the movement of the cart from one location to another location. The cart movement control means comprises: a handle member secured to the wheeled base member proximate the second set of wheels; a coupler secured to the wheeled base member proximate the first set of wheels, wherein the coupler is linkable to a tow bar of a second paper roll cart; and a tow bar secured to the wheeled base member proximate the second set of wheels, wherein the tow bar is linkable to a coupler of a second paper roll cart or a towing vehicle.

The paper roll cart may further comprise cart stabilizing means for maintaining stability of the paper roll cart during transport movement around corners. Additionally, the paper roll cart includes first safety means for preventing motion of the paper roll cart when rolling motion is not desired and second safety means for maintaining a coupled connection to another paper roll cart or towing vehicle.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIGS. 1-8. It will be appreciated that the apparatus may vary as to configuration and as to details of the parts, and that the method may vary as to the specific steps and sequence, without departing from the basic concepts as disclosed herein.

Figure 1:
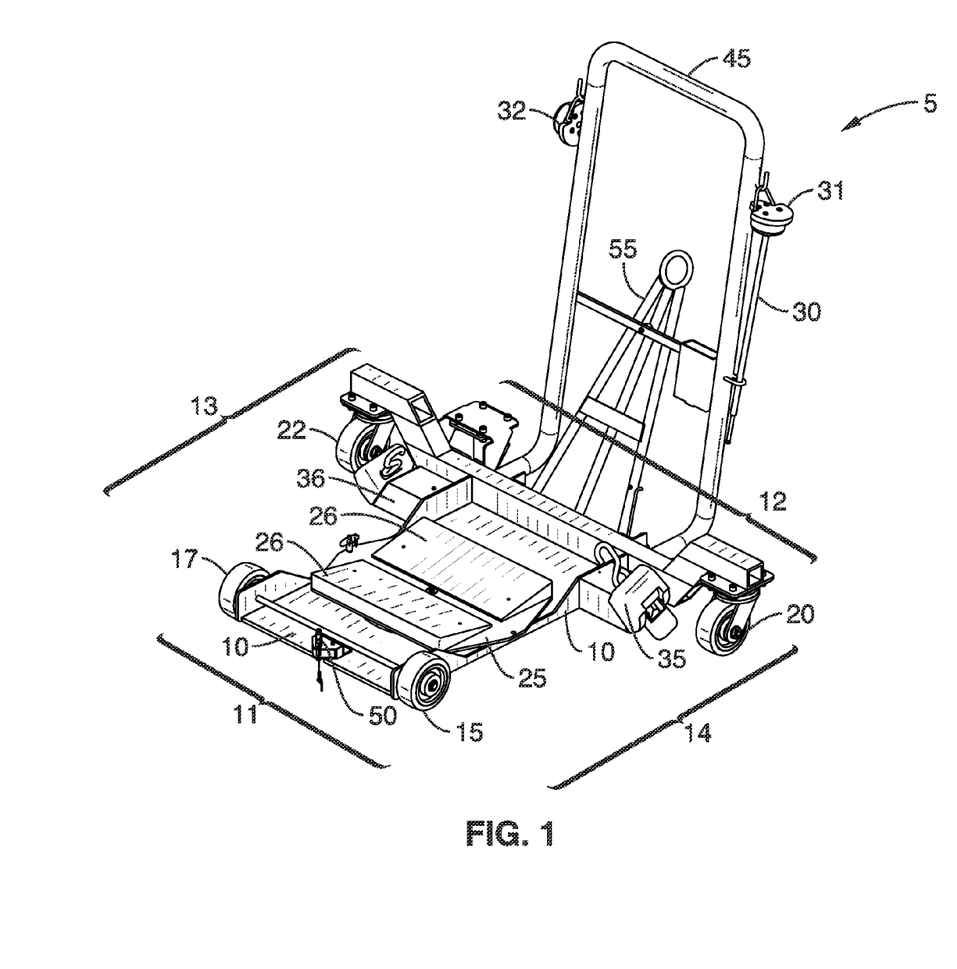
FIG. 1 is a perspective view of the subject invention.

The subject roll cart 5 is depicted in FIG. 1. Comprising the roll cart 5 is a wheeled base member 10 that is a substantially planar frame with a front region 11, a rear region 12, and two side regions 13 and 14 extending between the front 11 and rear 12 regions. A first set of wheels 15 and 17 are rotationally mounted to the front region of the wheeled base member or frame 10. A second set of wheels 20 and 22 are rotationally mounted to the rear region of the wheeled base member or frame 10. To permit the subject 5 cart to be utilized with unwinders and rewinders, the distance between the first set of wheels 15 and 17 is less than the distance between the second set of wheels 20 and 22. The narrower front region 11 permits use of the cart with varied unwinders and rewinders. Additionally, the wider set of second wheels 20 and 22 provide stabilizing means for maintaining stability of the roll cart 5 during transport movement around curves.

Figure 3:
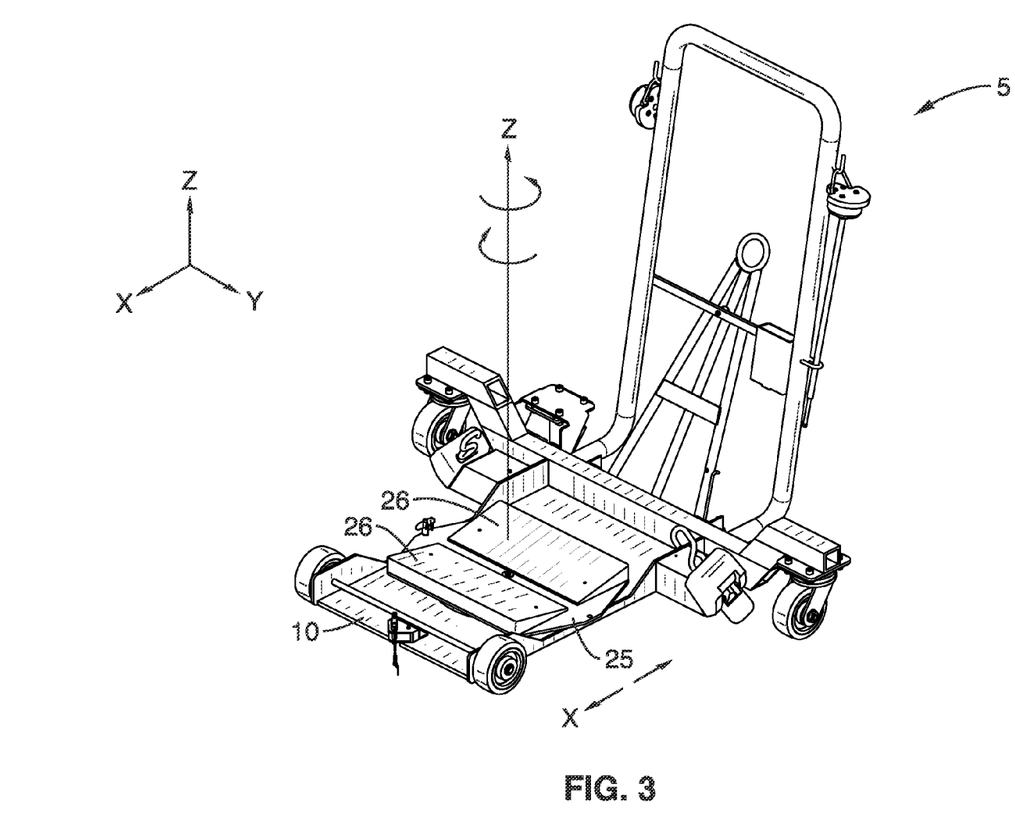
FIG. 3 is a perspective view of the subject invention demonstrating the 360 degree roll rotating feature.
Figure 8A:
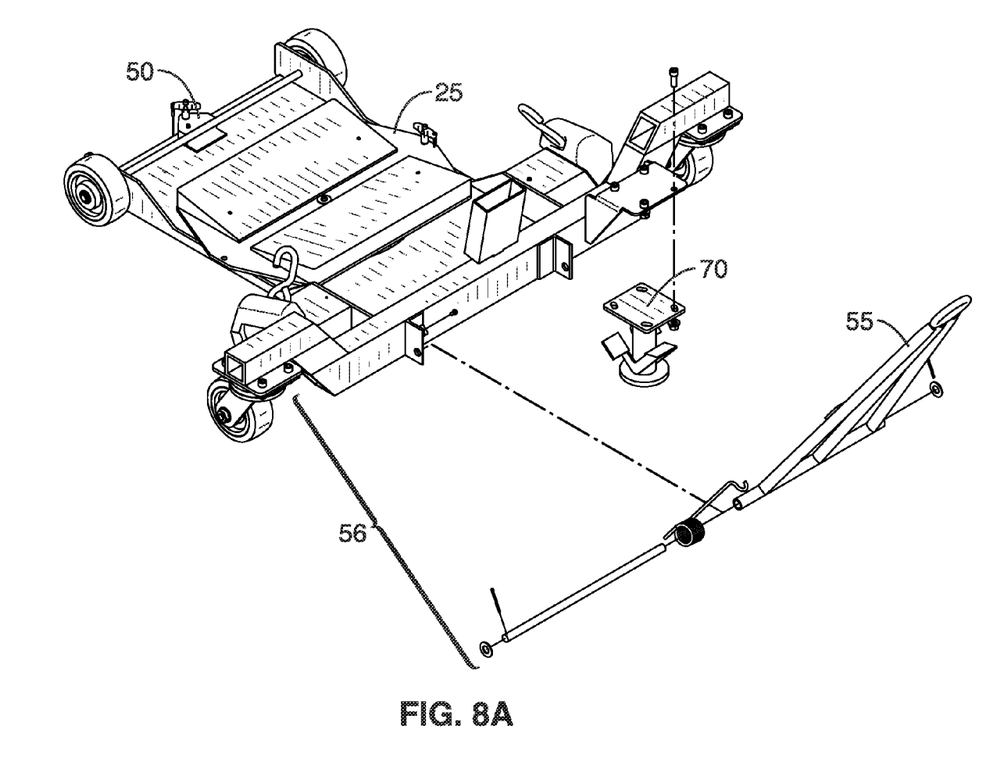
FIG. 8A shows a partially exploded rear-side perspective view of the subject invention in which the tow-bar and braking means of the subject device are stressed.
Figure 8B:
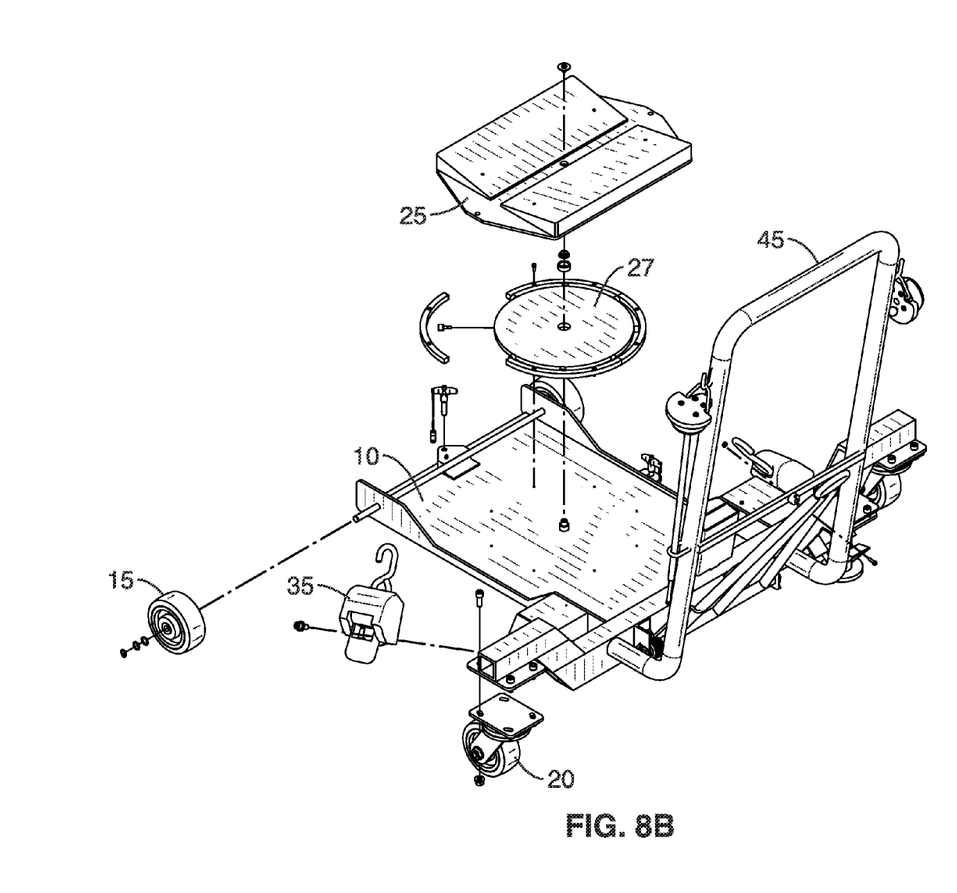
FIG. 8B shows a partially exploded rear-side perspective view of the subject invention in which wheels, strapping means, forward latch, and rotating platform of the of the subject device are stressed.
Figure 8C:
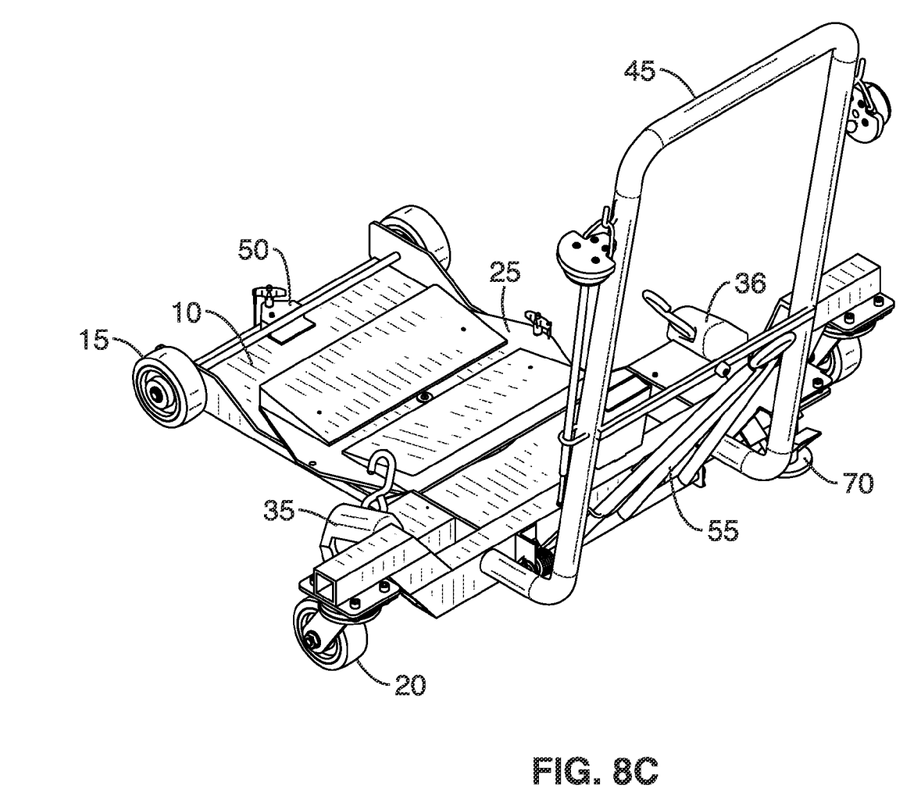
FIG. 8C shows a rear-side perspective view of the subject invention

Means for supporting the carried roll is provided in the form of a rotatable platform 25. The rotatable platform 25 has a concave upper surface 26 for receiving the roll, thereby preventing the roll from undesired rolling. The 360 degree rotational characteristic of the platform 25 is seen in FIG. 3 with rotation about a vertical "Z" axis. In particular, FIG. 8B shows an exploded view of a typical bearing assembly 27 that fits between the wheeled base 10 and the platform 25. Equivalent means for allowing rotation are contemplated as being within the realm of this disclosure.

Roll securing means are disclosed that prevent the roll from spilling off the cart 5. As functionally depicted in detail in FIGS. 2A and 2B, one preferred type of securing means comprises a roll securing rod 30 with a first strap/cable attachment means 31 secured to one end of the rod 30, and a second strap/cable attachment means 32 removably secured to the other end of the rod 30. Usually the second strap/cable attachment means 32 is a cap that removably locks onto the rod 30 by standard means such as threading, aperture/pin, and the like. Once the roll R is placed on the card 5, the rod 30 is inserted through the roll R and locked in place by the cap 32. For convenience of access, both the rod 30 and cap 32 are often stored in holders mounted to the cart 5.

Figure 2A:
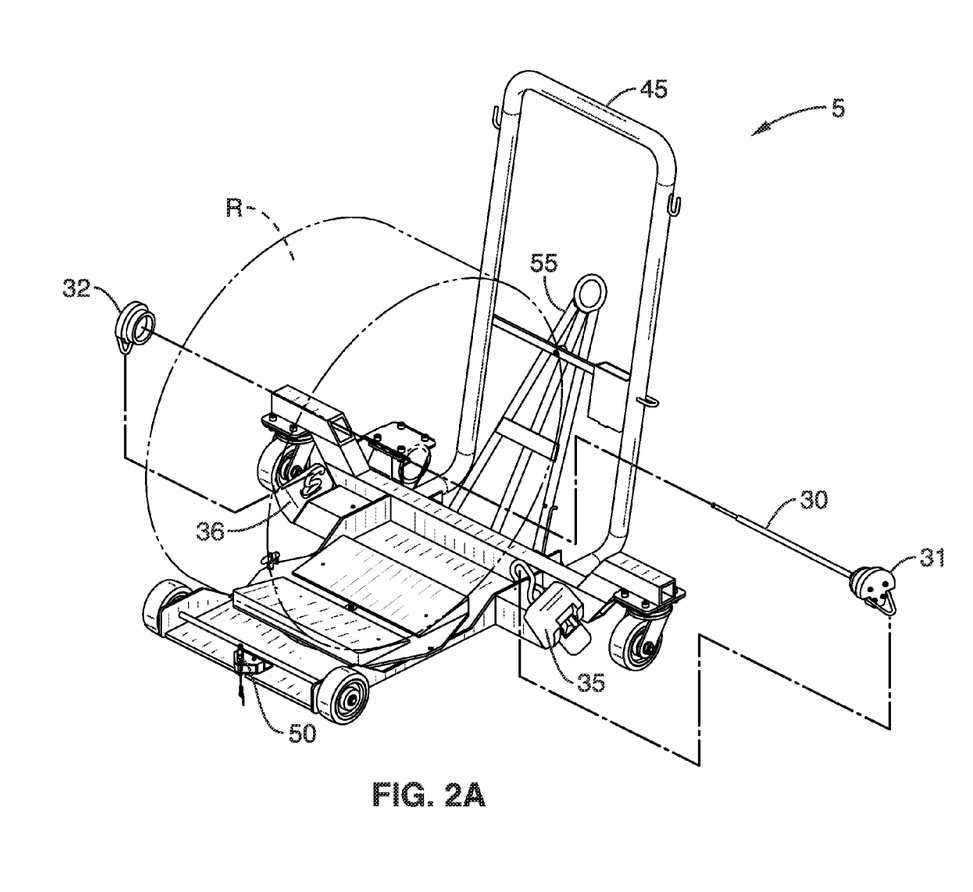
FIG. 2A is a partially exploded perspective view of the subject invention showing the open configuration of the roll-strapping means.
Figure 2B:
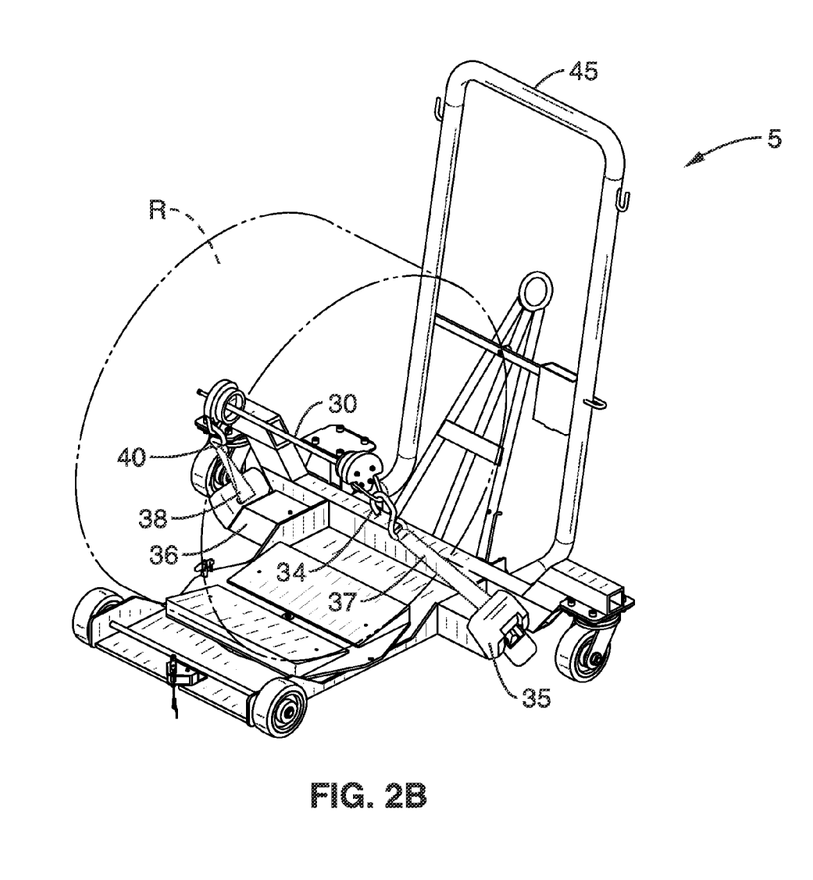
FIG. 2B is a partially exploded perspective view of the subject invention showing the locked configuration of the roll-strapping means.

Further comprising the roll securing means are first and second releasable and retractable strap/cable means 35 and 36 that are mounded to the wheeled base 10 along the side regions 13 and 14. Each of the first and second releasable and retractable strap/cable means 35 and 36 contain a retractable strap or cable 37 and 38 that is fitted with a hook 39 and 40 that attaches to the first and second strap/cable attachment means 31 and 31 on each end of the rod 30. The straps/cables 37 and 38 lock in place when desired to hold the roll R stable.

Figure 4A:
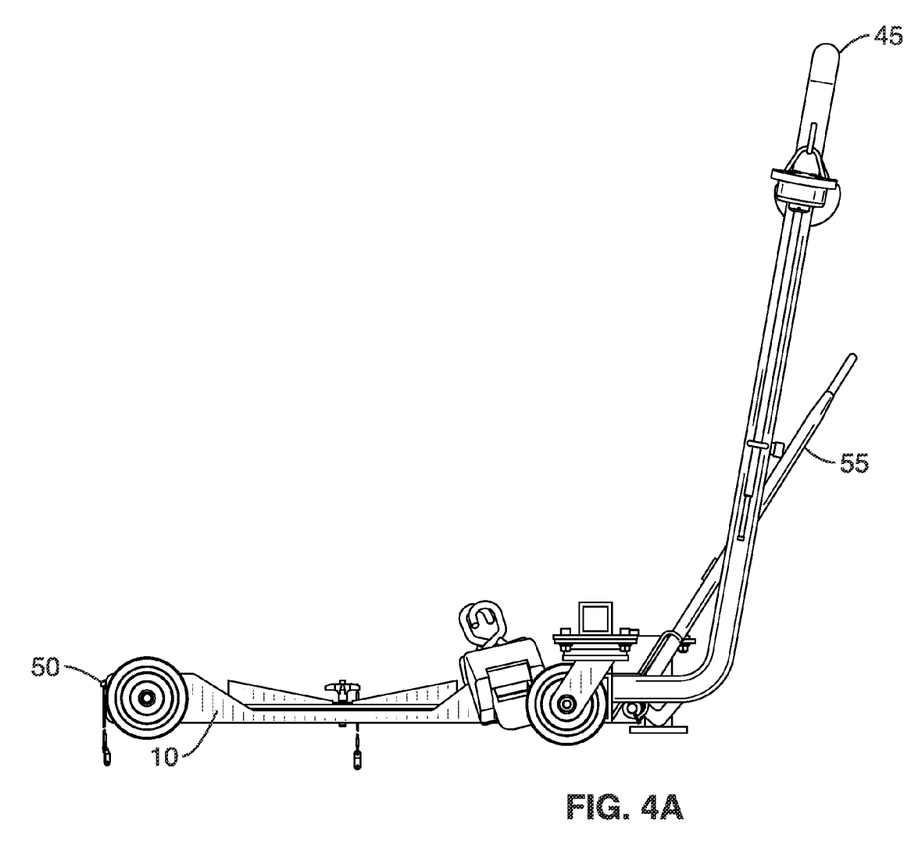
FIG. 4A is a side view of the subject invention showing the multiple-cart tow-bar in the raised position.
Figure 4B:
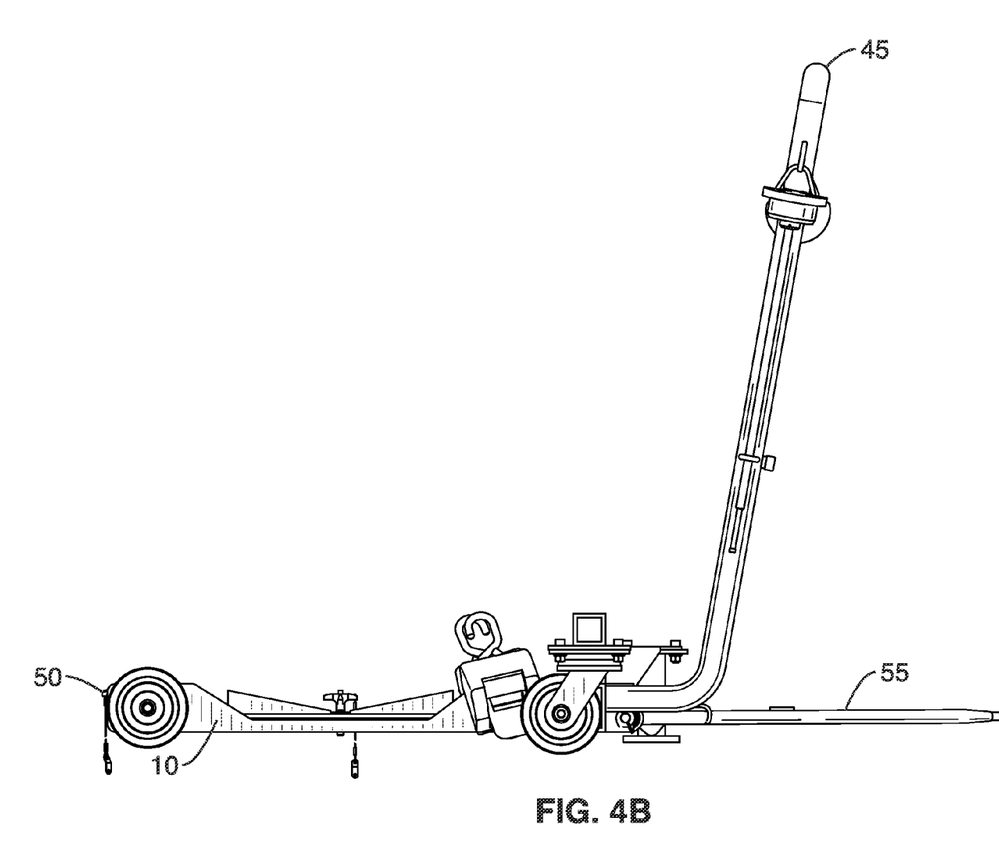
FIG. 4B is a side view of the subject invention showing the multiple-cart tow-bar in the lowered position.
Figure 5:
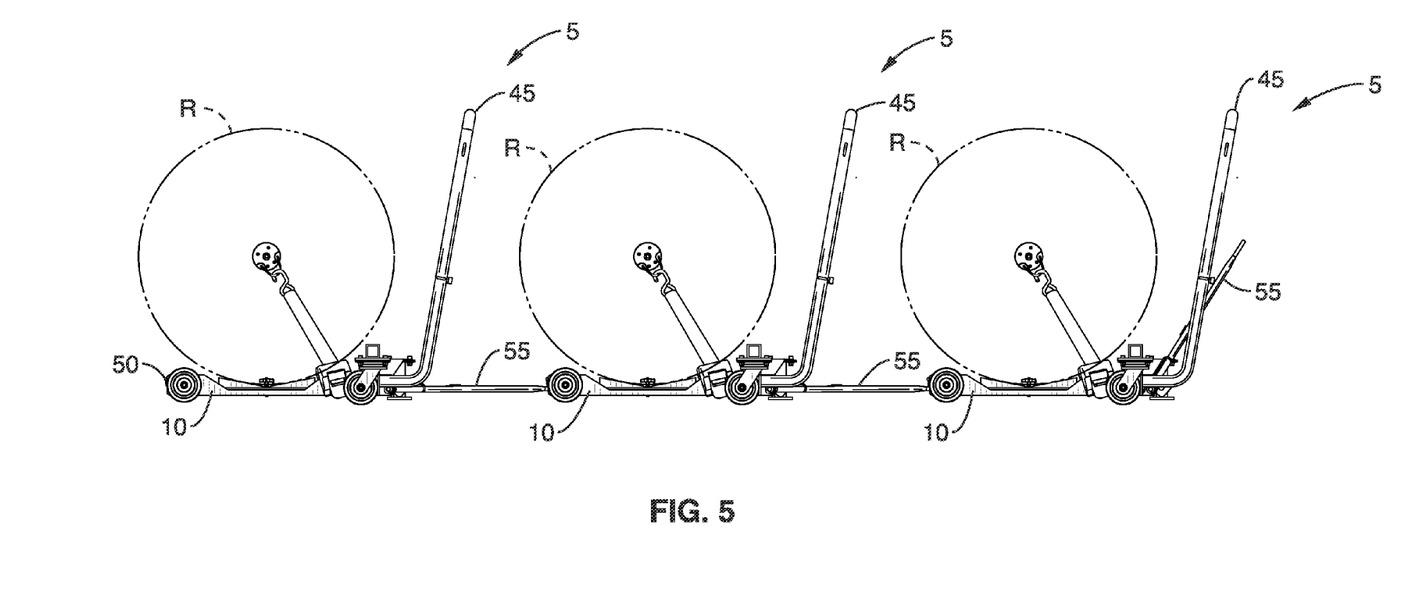
FIG. 5 is a side view of multiple (three carts for exemplary purposes only) carts trained together by tow-bar-to-latch connections.
Figure 6:
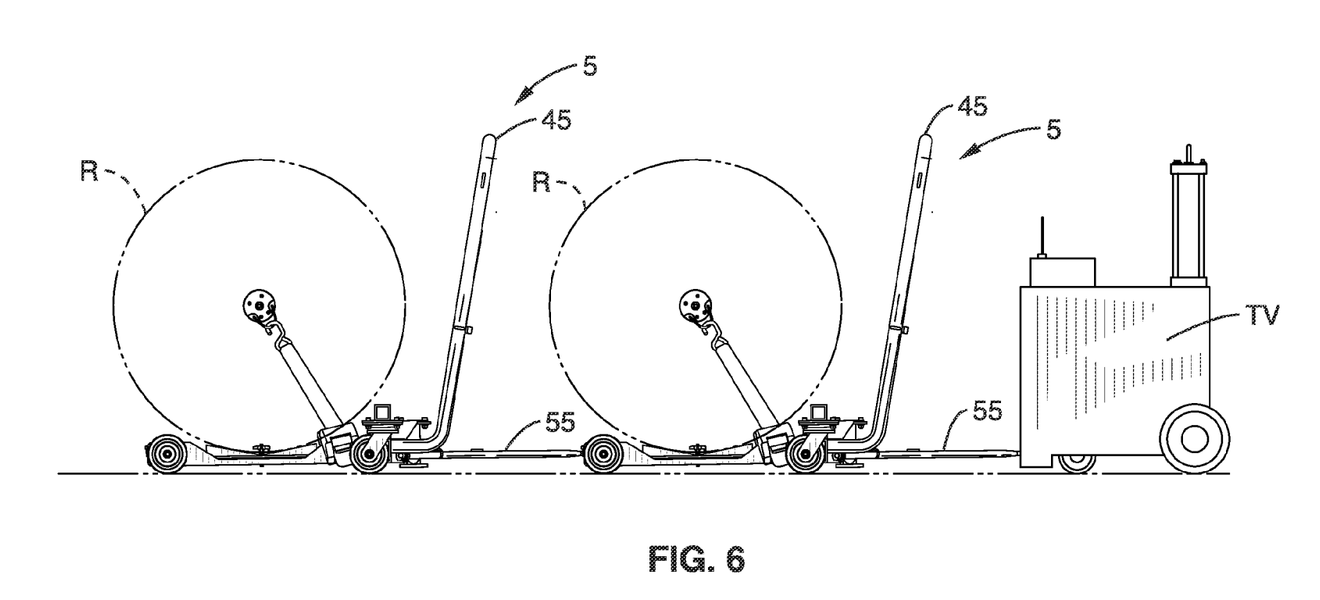
FIG. 6 is a side view of the subject invention showing two paper roll carts being towed by a powered towing device.
Figure 7:
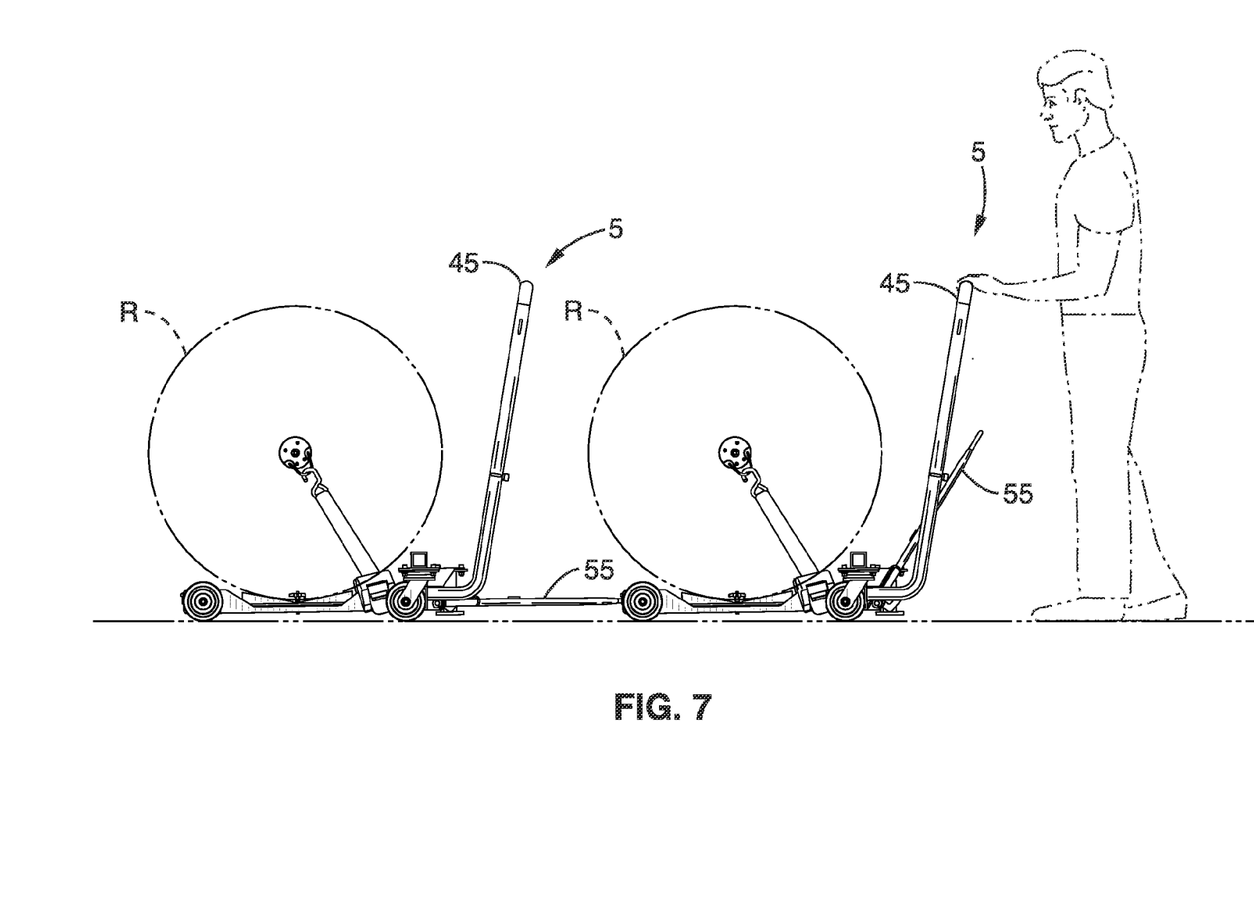
FIG. 7 is a side view of the subject invention showing two paper roll carts being towed by an operator.

Cart movement control means are related and comprise two general areas. First, a handle 45 is secured to the wheeled base member 10 and may be used by an operator (seen in FIG. 7) to move one or more carts 5. Frequently the handle 45 is a convenient place to store the rod 30 and cap 32 when not in use. Second, the movement control means includes a cart coupler 50 (and securing safety pin or equivalent means) and tow bar 55. The cart coupler 50 is mounted to the front region 11 of the cart 5 and the tow bar 55 is normally hinge mounted to the rear region 12 of the cart 5. FIG. 4A shows the tow bar 55 in the raised position and FIG. 5B show the tow bar in the lowered or transport position. FIG. 8A shows an exploded view of a typical hinge assembly 56 that secures the tow bar 55 to the wheeled base member 10. FIGS. 5-7 show the coupler 50 secured to the lowered tow bar 55 to link multiple carts 5 together.

A releasable locking brake 70 is seen in FIG. 8A. The brake 70 is a safety means that is used to prevent the cart 5 from rolling and is directly or indirectly connected to the wheeled base member 10.

Movement of the cart 5 is either by means of an operator (seen in FIG. 7) or a towing vehicle TV (seen in FIG. 6). Multiple carts 5 may be moved by linking them together by means of the coupler 50 to lowered tow bar 55 connection(s).

Thus, the subject invention is a material roll cart for storing, holding for usage, and transporting a variably-sized roll of material. The cart comprises a wheeled base member, a roll supporting means rotationally mounted to the wheeled base member, roll securing means coupled to the wheeled base member for releasably anchoring the roll to the cart, and cart movement control means attached to the wheeled base member for assisting in the movement of the cart from one location to another location.

Often the roll supporting means comprises a rotatable platform having a concave upper surface for receiving the material roll.

Usually, the roll securing means comprises, a roll securing rod having first and second ends, wherein the roll securing rod runs through the middle of the roll when the roll is secured to the cart, first strap attachment means fastened to the rod first end, second strap attachment means removably secured to the rod second end, first releasable strap means attached to the wheeled base member, wherein the first releasable strap means releasably couples to the first strap attachment means, and second releasable strap means attached to the wheeled base member, wherein the second releasable strap means releasably couples to the second strap attachment means.

Additionally, frequently the cart movement control means comprises a handle member secured to the wheeled base member. Often the cart movement control means comprises a coupler secured to the wheeled base member and a tow bar secured to the wheeled base member.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A material roll cart for storing, holding for usage, and transporting a variably-sized roll of material, comprising:
   a. a wheeled base member;
   b. a roll supporting means rotationally mounted to said wheeled base member, wherein said roll supporting means permits 360 degrees of rotation of the held roll about a vertical axis while said wheeled base member remains stationary;
   c. roll securing means coupled to said wheeled base member for releasably anchoring the roll to the cart;
   d. cart movement control means attached to said wheeled base member for assisting in the movement of said cart from one location to another location; and
   e. multiple cart linkage means that permits a plurality of carts to be linked to one another while still permitting said 360 degrees of rotation of the said held roll about said vertical axis while said wheeled base member remains stationary.

2. A material roll cart according to claim 1, wherein said roll supporting means comprises a 360 degree-rotatable platform having a concave upper surface for receiving the material roll.

3. A material roll cart according to claim 1, wherein said roll securing means comprises:
   a. a roll securing rod having first and second ends, wherein said roll securing rod runs through the middle of the roll when the roll is secured to the cart;
   b. first strap attachment means fastened to said rod first end;
   c. second strap attachment means removably secured to said rod second end;
   d. first releasable strap means attached to said wheeled base member, wherein said first releasable strap means releasably couples to said first strap attachment means; and
   e. second releasable strap means attached to said wheeled base member, wherein said second releasable strap means releasably couples to said second strap attachment means.

4. A material roll cart according to claim 1, wherein said cart movement control means comprises a handle member secured to said wheeled base member.

5. A material roll cart according to claim 1, wherein said multiple cart linkage means comprises:
   a. a coupler secured to said wheeled base member and
   b. a tow bar secured to said wheeled base member.

6. A paper roll cart for storing, holding for usage, and transporting variably-sized rolls of paper, comprising:
   a. a wheeled base member, comprising;
      i. a base frame having a front region, a rear region, and two side regions extending between said front and rear regions;
      ii. a first set of wheels mounted to said base frame front region; and
      iii. a second set of wheels mounted to said base frame rear region;
   b. paper roll supporting means rotationally mounted to said wheeled base member, wherein said roll supporting means permits 360 degrees of rotation of the held roll about a vertical axis while said wheeled base member remains stationary;
   c. paper roll securing means coupled to said wheeled base member for releasably anchoring the roll to the cart; and
   d. cart movement control means attached to said wheeled base member for assisting in the movement of said cart from one location to another location; and
   e. multiple cart linkage means that permits a plurality of carts to be linked to one another while still permitting said 360 degrees of rotation of the said held roll about said vertical axis while said wheeled base member remains stationary.

7. A paper roll cart according to claim 6, wherein said paper roll supporting means comprises a 360 degree-rotatable platform having a concave upper surface for receiving the paper roll.

8. A paper roll cart according to claim 6, wherein said paper roll securing means comprises:
   a. a paper roll securing rod having first and second ends, wherein said paper roll securing rod runs through the middle of the paper roll when the paper roll is secured to the cart;
   b. first strap attachment means fastened to said rod first end;
   c. second strap attachment means removably secured to said rod second end;
   d. first releasable strap means attached to said wheeled base member proximate said second set of wheels, wherein said first releasable strap means releasably couples to said first strap attachment means; and
   e. second releasable strap means attached to said wheeled base member proximate said second set of wheels, wherein said second releasable strap means releasably couples to said second strap attachment means.

9. A paper roll cart according to claim 6, wherein said cart movement control means comprises a handle member secured to said wheeled base member proximate said second set of wheels.

10. A paper roll cart according to claim 6, wherein said multiple cart linkage means comprises:
    a. a coupler secured to said wheeled base member proximate said first set of wheels, wherein said coupler is linkable to a tow bar of a second paper roll cart; and b. a tow bar secured to said wheeled base member proximate said second set of wheels, wherein said tow bar is linkable to a coupler of a second paper roll cart or a towing vehicle.

11. A paper roll cart according to claim 6, further comprising cart stabilizing means for maintaining stability of the paper roll cart during transport movement around corners, wherein said stabilizing means comprises said second set of wheels having a wider set than said first set of wheels.

12. A paper roll cart according to claim 6, wherein first distance between said first set of wheels is less than second distance between said second set of wheels for stability and winder/unwinder access purposes.

13. A paper roll cart according to claim 6, further comprising:
   a. first safety means for preventing motion of the paper roll cart when rolling motion is not desired and
   b. second safety means for maintaining a coupled connection to another paper roll cart or towing vehicle.

14. A paper roll cart for storing, holding for usage, and transporting variably-sized rolls of paper, comprising:
   a. a wheeled base member, comprising:
      i. a base frame having a front region, a rear region, and two side regions extending between said front and rear regions;
      ii. a first set of wheels mounted to said base frame front region; and
      iii. a second set of wheels mounted to said base frame rear region, wherein said first set of wheels are spaced closer to one another than in said second set of wheels for stability and winder/unwinder access purposes;
   b. paper roll supporting means rotationally mounted to said wheeled base member, wherein said roll supporting means permits 360 degrees of rotation of the held roll about a vertical axis while said wheeled base member remains stationary, wherein said paper roll supporting means comprises a 360 degree-rotatable platform having a concave upper surface for receiving the paper roll;
   c. paper roll securing means coupled to said wheeled base member for releasably anchoring the roll to the cart, wherein said paper roll securing means comprises:
      i. a paper roll securing rod having first and second ends, wherein said paper roll securing rod runs through the middle of the paper roll when the paper roll is secured to the cart;
      ii. first strap attachment means fastened to said rod first end;
      iii. second strap attachment means removably secured to said rod second end;
      iv. first releasable strap means attached to said wheeled base member proximate said second set of wheels, wherein said first releasable strap means releasably couples to said first strap attachment means; and
      v. second releasable strap means attached to said wheeled base member proximate said second set of wheels, wherein said second releasable strap means releasably couples to said second strap attachment means; and
   d. cart movement control means attached to said wheeled base member for assisting in the movement of said cart from one location to another location, wherein said cart movement control means comprises a handle member secured to said wheeled base member proximate said second set of wheels; and
   e. multiple cart linkage means that permits a plurality of carts to be linked to one another while still permitting said 360 degrees of rotation of the said held roll about said vertical axis while said wheeled base member remains stationary.

15. A paper roll cart according to claim 14, further comprising cart stabilizing means for maintaining stability of the paper roll cart during transport movement around corners, wherein said stabilizing means comprises said second set of wheels having a wider set than said first set of wheels.

16. A paper roll cart according to claim 14, further comprising:
   a. first safety means for preventing motion of the paper roll cart when rolling motion is not desired; and
   b. second safety means for maintaining a coupled connection to another paper roll cart or towing vehicle.

* * * * *